US 6,564,932 B2

(12) United States Patent
Itoh

(10) Patent No.: US 6,564,932 B2
(45) Date of Patent: May 20, 2003

(54) BELT CONVEYOR

(75) Inventor: Kazuo Itoh, Kasai (JP)

(73) Assignee: Itoh Electric Co., Ltd., Hyogo (JP)

( * ) Notice: Subject to any disclaimer, the term of this patent is extended or adjusted under 35 U.S.C. 154(b) by 0 days.

(21) Appl. No.: 09/841,353

(22) Filed: Apr. 24, 2001

(65) Prior Publication Data

US 2002/0134651 A1 Sep. 26, 2002

(30) Foreign Application Priority Data

Apr. 24, 2000 (JP) ........................................ 2000-122517

(51) Int. Cl.⁷ ................................................ B65G 23/04
(52) U.S. Cl. ........................................ 198/835; 198/834
(58) Field of Search ................................ 198/832, 834, 198/835, 842

(56) References Cited

U.S. PATENT DOCUMENTS 3,015,381 A * 1/1962 Mohwinkel et al. ........ 198/835
3,980,174 A * 9/1976 Conrad ...................... 198/835
4,072,062 A * 2/1978 Morling et al. ............. 198/834
4,449,958 A * 5/1984 Conrad .................... 198/834 X

FOREIGN PATENT DOCUMENTS

| JP | H3-56712 | 5/1991 |
| JP | H9-124123 | 5/1997 |

* cited by examiner

Primary Examiner—James R. Bidwell
(74) Attorney, Agent, or Firm—Koda & Androlia

(57) ABSTRACT

A belt conveyor comprising an endless, fixed-width belt mounted on a pulley provided on rollers. Protrusions are formed on the back surface of the endless, fixed-width belt, and each of the protrusions has a shape comprising inwardly curved front and rear sides and tapering towards its tip end, and the pulley that is detachably mounted to each of the rollers is formed with holes, and each of the holes has a shape that fits each of the protrusions of the belt. The protrusions of the belt snugly engage with holes of the pulley, thus preventing meandering of the rotating belt.

5 Claims, 4 Drawing Sheets

BELT CONVEYOR

BACKGROUND OF THE INVENTION

1. Field of the Invention

The present invention relates to an improvement in a belt conveyor that includes protrusions formed on a conveyor belt and holes formed on a pulley that mesh the protrusions.

2. Prior Art

FIG. 6 shows one type of belt conveyor system. In this system, an elongated protrusion 2' is formed on the back surface of a conveyor belt 1' so as to extend in the belt running direction, and this elongated protrusion 2' fits in a peripheral groove 4' formed in the periphery of the pulley 3'. This system is disclosed in, for instance, Japanese Utility Model Application Laid-Open (Kokai) No. H3-56712.

This belt conveyor prevents the conveyor belt 1' from meandering thanks to the engagement of the protrusion and the groove. However, the engagement between the protrusions and the groove does not transmit the driving force of the pulley to the belt.

Other types of belt conveyors are shown in FIGS. 7 and 8. In FIG. 7, teeth 6' are formed on the back of the conveyor belt 5', and these teeth 6' are meshed with teeth 8' formed in the periphery of the pulley 7'. In FIG. 8, a cogged belt 10' is attached to one side of the conveyor belt 9' and a flanged wheel 12' is mounted on one side of the pulley 11' so that the cogs of the belt and the flanges of the wheel mesh each other. This conveyor is disclosed in, for instance, Japanese Patent Application Laid-Open (Kokai) No. H9-124123.

In these belt conveyors, the conveyor belt 5' (FIG. 7) and the conveyor belt 9' (FIG. 8) which is equipped with the cogged belt 10' are respectively used as a timing belt; and the pulley 7' (FIG. 7) and the pulley 11' which is equipped with the flanged wheel 12' (FIG. 8) are respectively used as a timing pulley.

In all of these prior arts, the cross sectional shape of the teeth is trapezoid. Because of this shape, when the driving-force-transmission power weakens or when the belt is stretched out, the belt tension becomes weak. When this happens, the belt tension needs to be adjusted.

The biggest problem with these belt conveyors is that different types of belts are required for different types of belt conveyors. For example, the belt 5' in FIG. 7 and the belts in FIG. 8 are all different. Also, the belt having teeth that mesh the teeth of a timing belt formed at the center of a pulley (see FIG. 7) and the belt having teeth for meshing the teeth of a timing belt formed at both ends of a pulley (not shown) are different.

SUMMARY OF THE INVENTION

In view of the above, the first object of the present invention is to provide a conveyor belt that is free from meandering and does not require adjustment of belt tension. Another object of the present invention is to facilitate the manufacture of a driving roller and to make it possible to use a common belt for different types of conveyors.

To accomplish the first object, in the present invention, each of the protrusions formed on the back surface of a conveyor belt comprises inwardly curved front and rear sides thus tapering towards the top, and the periphery of a pulley is formed with holes that are shaped so as to fit the protrusions.

With this structure, the peculiarly shaped protrusions of the conveyor belt and the holes of the pulley that are shaped so as to fit the protrusions drive the conveyor when they mesh with each other, thus preventing the conveyor belt from meandering. Since the protrusions of the belt and the holes of the pulley are constantly meshed with each other, the belt tension is constant at all times, eliminating the need for tension adjustment.

Preferably, the pulley is a separate unit from and is detachable from the roller. As a result, the pulley and the roller can be manufactured independently, and the pulley can be easily attached to the roller. Moreover, the holes of the pulley can be made by pressing (burring), so that the manufacturing process of components is easy.

The conveyor belt, which has a fixed width and the protrusions thereon, may be used alone. Instead, such a belt having the protrusions can be fastened at a certain position on the back surface of a flat (wide) belt.

In other words, a conveyor for carrying goods can be easily composed using the fixed width conveyor(s). By fastening the fixed width conveyor belt(s) at a certain position(s) on the back surface of a flat (wide) belt, it is possible to use same type of flat belts for rollers having pulleys at different locations. For instance, for a roller with pulleys mounted at both ends thereof, fixed width belts are provided on both edges of a flat belt; and for a roller with a pulley at its center, a single fixed width belt is provided at the center of a flat belt. In either case, since the conveyor belts have the same fixed width, the fixed width conveyor belts can be fastened at appropriate locations (edges or center, for instance) on the back surface of the flat belts of the same type. Thus, the same type of flat belts can be commonly used for rollers having pulleys at different locations.

BRIEF DESCRIPTIONS OF THE DRAWINGS

FIG. 1 is a partially cut-away perspective view of a conveyor for carrying articles according to the present invention in which two fixed width conveyor belts are used with a space in between;

FIG. 7 is a partially cut-away perspective view of a conventional belt conveyor in which teeth are formed on the back surface of the conveyor belt so as to engage with teeth formed in the pulley; and.

DETAILED DESCRIPTION OF THE INVENTION

Preferred embodiments of the present invention will be described below with reference to FIGS. 1 to 5. Though pair of rollers 2 are used in the embodiments, FIGS. 1 through 5 show only one roller 2 and the following description is made for the shown roller 2.

Figure 1:
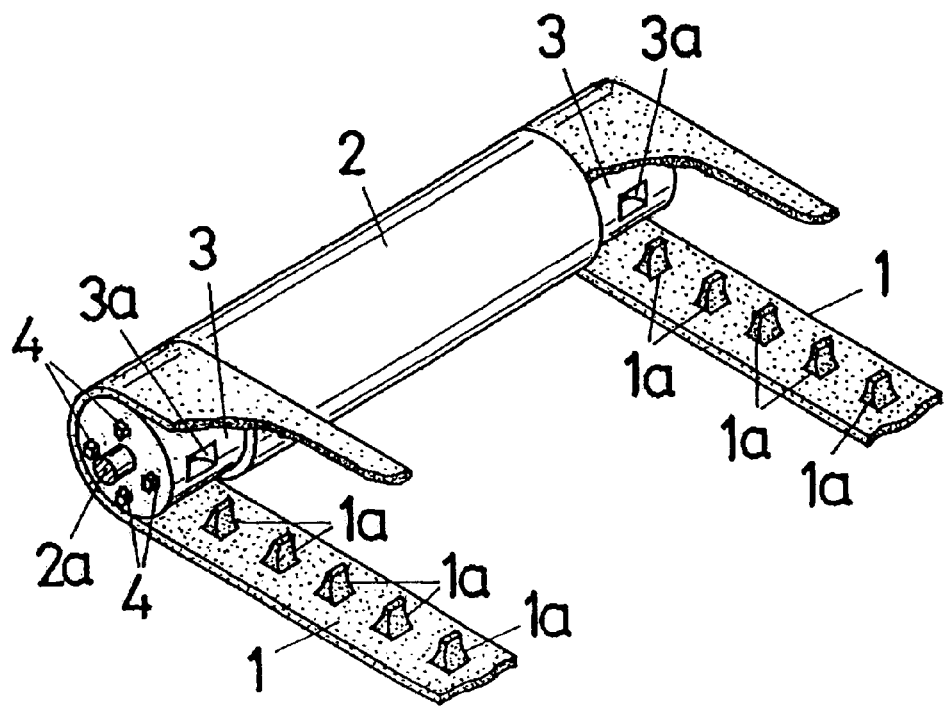
Figure 4:
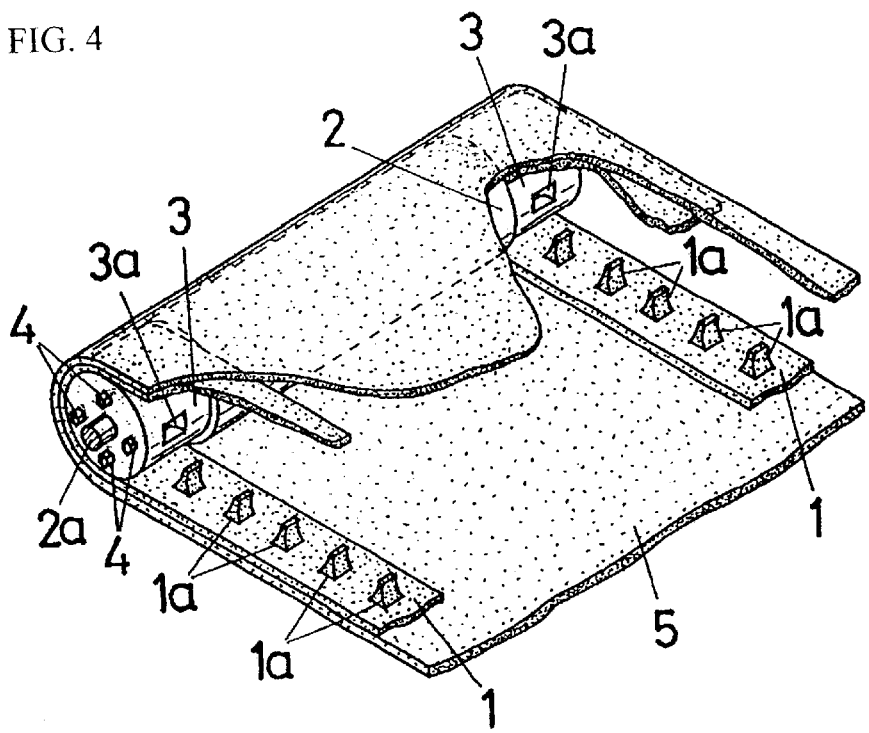
FIG. 4 is a partially cut-away perspective view of a conveyor for carrying articles according to the present invention in which two fixed width conveyor belts are fastened to the back surface of a flat belt so as to correspond to the pulleys at both ends of the roller.
Figure 5:
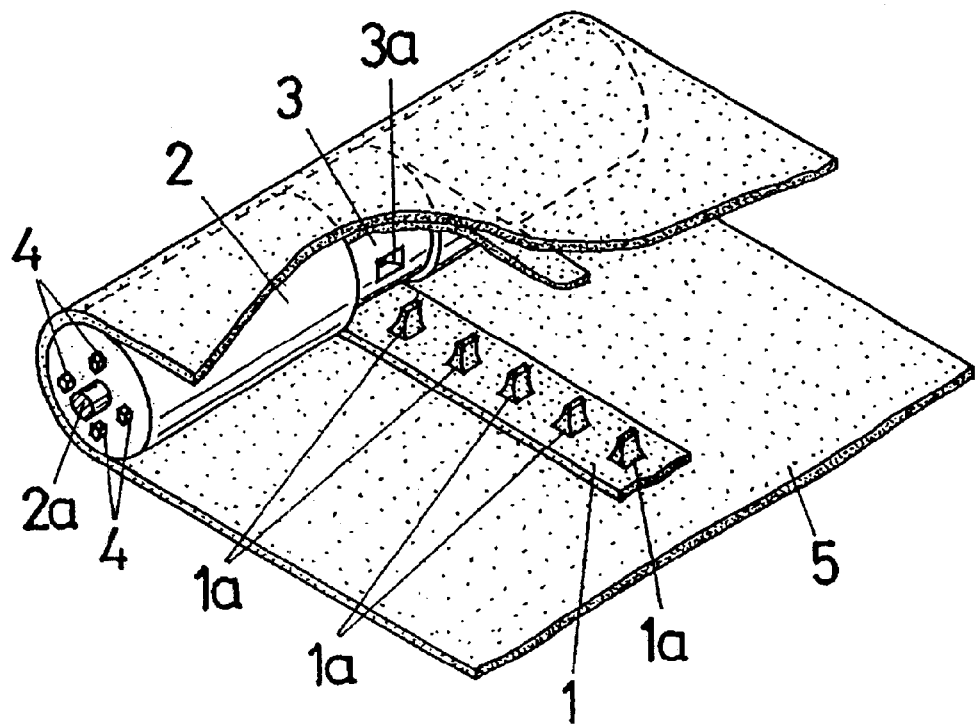
FIG. 5 is a partially cut-away perspective view of a conveyor for carrying articles according to the present invention in which a single fixed width conveyor belt is fastened to the back surface of a flat belt so as to correspond to the pulley at the center of the roller.
Figure 6:
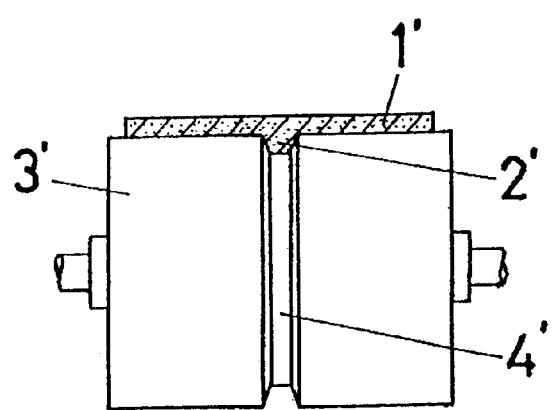
FIG. 6 is a longitudinal sectional view of a prior art conveyor belt for preventing meandering of the belt.
Figure 7:
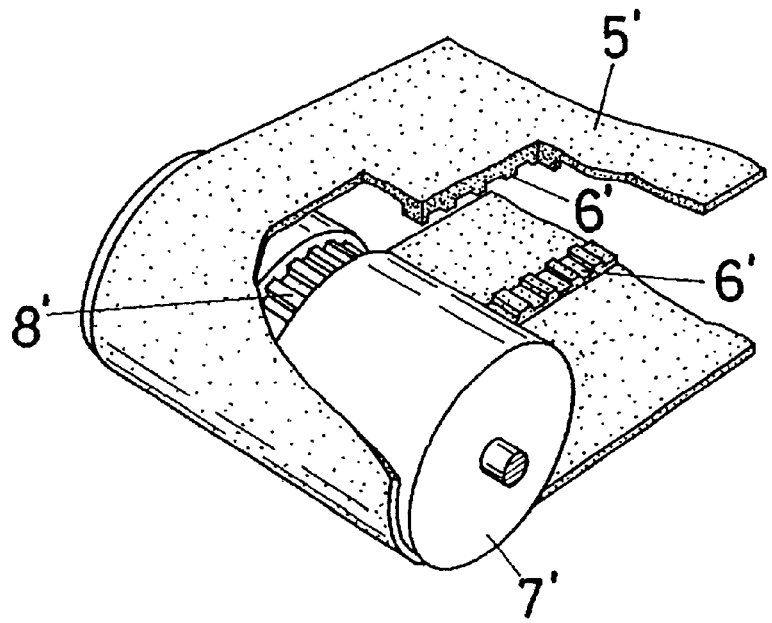
Figure 8:
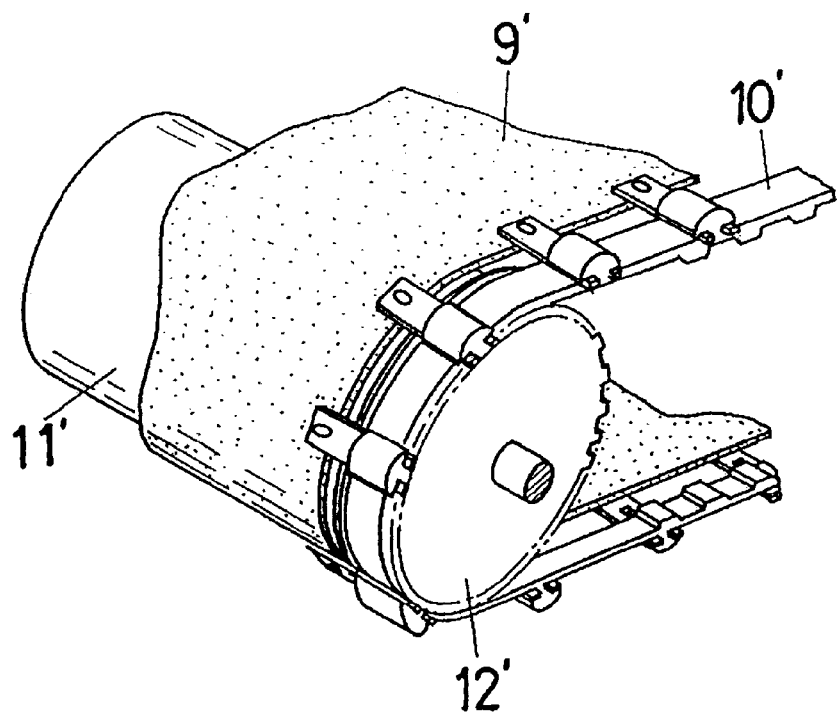
FIG. 8 is a perspective view of another conventional belt conveyor in which a cogged belt is attached to one side of the conveyor belt, and a flanged wheel is mounted at one end the pulley so that the cogs of the belt and the flanges of the wheel mesh with each other.

FIGS. 1, 4 and 5 illustrate examples of a conveyor for carrying articles using a fixed width conveyor 1.

In the embodiments of FIGS. 1 and 4, a roller 2 is equipped with pulleys 3 at its both ends, and two fixed width conveyor belts (endless belts) 1 are respectively mounted on the pulleys 3. In the embodiment of FIG. 5, a roller 2 is equipped with a single pulley 3 at its center, and a fixed width conveyor belt (endless belt) 1 is mounted on this single pulley 3.

In both embodiments, protrusions 1a are formed on the back surface of each of the conveyor belts 1 and holes 3a are formed in the periphery of the pulley 3; and these protrusions 1a and holes 3a are meshed with each other.

Figure 2:
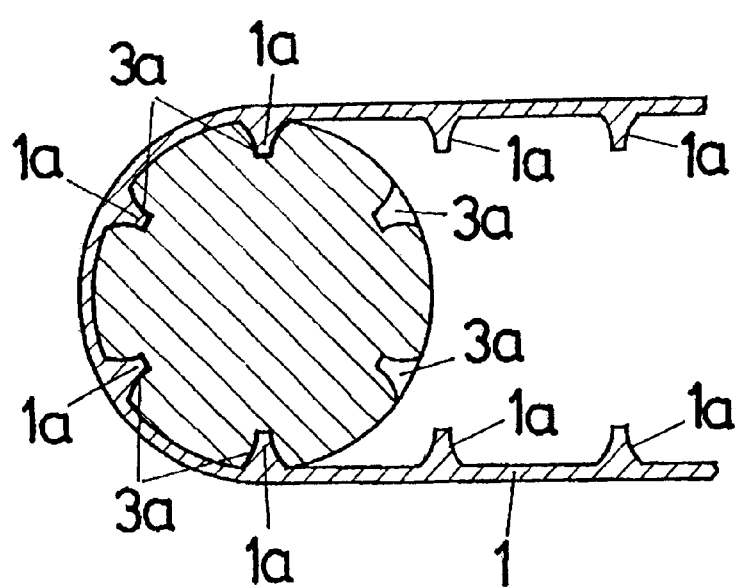
FIG. 2 is an enlarged longitudinal cross-sectional view of the pulley and conveyor belt, illustrating the protrusions on the back surface of the conveyor belt meshing with the holes formed in the pulley.

The protrusions 1a and the holes 3a have peculiar shapes as best seen from FIG. 2. More specifically, each of the protrusions 1a of the conveyor belt 1 comprises inwardly curved front and rear sides so as to taper towards the top or the tip end (The terms "front" and "rear" are used with reference to the direction of the rotation of the belt). In other words, the protrusions 1a are shaped like the teeth of a chain sprocket. On the other hand, each of the holes 3a of the pulley 3 is shaped so as to fit and snugly receive each of the protrusions 1a of the belt 1.

By shaping the protrusions 1a of the conveyor belt 1 and the holes 3a of the pulley 3 as described above, the protrusions 1a of the conveyor belt 1 and the holes 3a of the pulley 3 that are shaped so as to fit the protrusions 1a drive the conveyor as they mesh and engage with each other, thus preventing the conveyor 1 from meandering. Since the protrusions 1a of the conveyor 1 and the holes 3a of the pulley 3 are meshed with each other constantly, the belt tension can remain steady, requiring no tension adjustments.

Figure 3:
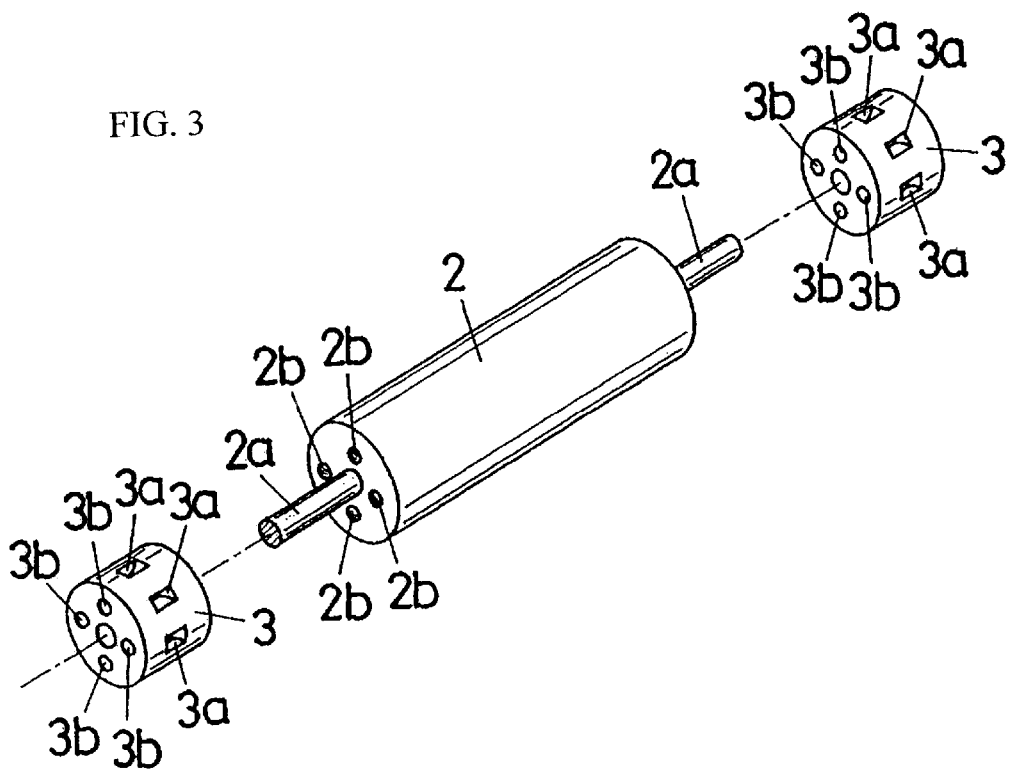
FIG. 3 is an exploded perspective view showing the pulleys separated from the roller.

In the embodiment shown in FIG. 3, each of two pulleys 3 is a separate unit and is detachable from the roller 2. The pulleys 3 are mounted to the roller 2 by mounting bolts 4 (see FIGS. 1 and 4). Each pulley 3 is mounted on the shaft 2a that protrudes from both ends of the roller 2, and the mounting bolts 4 are inserted through the insertion holes 3b of the pulley 3 and screwed into the threaded holes 2b of the roller 2 that are formed in both ends of the roller 2. The pulleys 3 are thus attached to the roller 2.

With the structure above, the pulleys 3 and the roller 2 can be manufactured separately, and the pulleys 3 can be mounted on the roller 2 easily. Moreover, the holes 3a of the pulley 3 can be made by pressing (burring). Accordingly, the manufacture of the components (pulleys and rollers) can be simplified.

As described above, the width of the conveyor 1 is fixed; and in FIG. 1 a pair of fixed width conveyor belts 1 is used without the aid of another (different) belt so as to form a conveyor for carrying articles. Thus, a conveyor for carrying articles is comprised of fixed width conveyor belts and is obtained easily without any additional, different type of belts.

In the embodiments of FIGS. 4 and 5, on the other hand, a conveyor for carrying articles comprises a fixed width conveyor belt(s) 1 fastened to the back surface of a flat (wide) belt (wide endless belt) 5 that is larger in width than the belt(s) 1. In FIG. 4, two fixed width conveyor belts 1 are fastened to the back surface of the flat belt 5 so that the belts 1 having the protrusions 1a positionally correspond to pulleys 3, and these belts 1 are mounted on the pulleys 3 provided at both ends of the roller 2. In FIG. 5, a single fixed width conveyor belt 1 is fastened to the back surface of a flat (wide) belt 5 so that the belt 1 having the protrusions 1a corresponds to the pulley 3, and this belt 1 is mounted on the pulley 3 that is at the center of the roller 2. The fixed width conveyor(s) 1 is fastened to the flat belt 5 by way of, for instance, sewing and welding.

As seen from the above, in the present invention, a fixed width conveyor belt(s) 1 is fastened at a certain position (at the center or near the side edges, for instance) of the back surface of the flat (wide) belt 5. Accordingly, the same flat belt 5 can be used even if the mounting positions of the pulley(s) 3 on rollers 2 are different.

For instance, for a roller 2 with pulleys 3 mounted at both ends thereof, fixed width conveyor belts 1 are provided on both edges of a flat belt 5; and for a roller 2 with a pulley 3 at its center, a single fixed width conveyor belt 1 is provided at the center of a flat belt 5. In either case, since the conveyor belts 1 have the same fixed width, the belts 1 can be fastened at appropriate locations (edges or center, for instance) on the back surface of the same type of flat belts 5. Thus, the same type of flat belts 5 can be commonly used for rollers 2 having pulleys 3 at different locations.

As described above, on the back surface of each conveyor belt 1, the protrusions 1a each having inwardly curved front and rear sides that taper towards the top (or tip end) are provided. In addition, in the periphery of the pulley 3, holes 3a that are shaped so as to fit the protrusions 1a are provided.

In addition, according to the present invention, the meandering of the conveyor is effectively prevented, and the belt tension is prevented from weakening, thus eliminating the need for tension adjustments.

Furthermore, the pulleys and rollers can be manufactured separately, and they can be assembled together easily. In addition, the holes in the pulley(s) can be opened by a pressing (burring) method. In other words, the components of the conveyor can be manufactured easily.

Also, according to the present invention, the same flat belt can be used for rollers that have pulley(s) at different positions.

I claim:

1. A belt conveyor comprising a conveyor belt and a pulley wherein:

said conveyor belt is provided on a back surface thereof with protrusions, each of said protrusions comprising inwardly curved front and rear sides, thus tapering towards a tip end thereof;

said pulley is provided in a periphery thereof with holes, each of said holes being shaped so as to fit each of said protrusions; and said pulley is a separate unit from and is detachably mounted on a roller.

2. The belt conveyor according to claim 1, wherein said conveyor belt has a fixed width and is fastened on a back surface of a flat belt that is larger in width than said conveyor belt.

3. The belt conveyor according to claim 1, wherein said conveyor belt has a fixed width and is used in a plural number.

4. The belt conveyor according to claim 1, wherein said conveyor belt has a fixed width and is used in a plural number.

5. A belt conveyor comprising a conveyor belt and a pulley wherein:

said conveyor belt is provided on a back surface thereof with protrusions, each of said protrusions comprising inwardly curved front and rear sides, thus tapering towards a tip end thereof;

said pulley is provided in a periphery thereof with holes, each of said holes being shaped so as to fit each of said protrusions; and said conveyor belt has a fixed width and is fastened on a back surface of a flat belt that is larger in width than said conveyor belt.

* * * * *